(12) United States Patent
Gutierrez et al.

(10) Patent No.: US 11,472,280 B2
(45) Date of Patent: Oct. 18, 2022

(54) CONICAL MOUNT WITH ROTATING RADIAL SNUBBER ASSEMBLY

(71) Applicant: GM GLOBAL TECHNOLOGY OPERATIONS LLC, Detroit, MI (US)

(72) Inventors: Michael A. Gutierrez, Dearborn Heights, MI (US); Michael T. Quaggiotto, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 17/143,408

(22) Filed: Jan. 7, 2021

(65) Prior Publication Data
US 2022/0212532 A1    Jul. 7, 2022

(51) Int. Cl.
 *B60K 5/12*   (2006.01)
 *B60K 5/00*   (2006.01)
 *F16F 15/08*  (2006.01)

(52) U.S. Cl.
CPC ............ *B60K 5/1208* (2013.01); *F16F 15/08* (2013.01); *F16F 2226/045* (2013.01); *F16F 2234/04* (2013.01)

(58) Field of Classification Search
USPC .................................................. 267/140.13
See application file for complete search history.

(56) References Cited

U.S. PATENT DOCUMENTS

| | | | | | |
|---|---|---|---|---|---|
| 4,422,779 A | * | 12/1983 | Hamaekers | ............. | F02N 15/08 267/140.13 |
| 4,693,217 A | * | 9/1987 | Beer | ....................... | F16F 7/108 123/195 A |
| 4,896,867 A | * | 1/1990 | Schyboll | ............... | F16F 13/107 180/902 |
| 5,024,461 A | * | 6/1991 | Miyakawa | ................ | F16F 9/54 280/124.155 |
| 5,103,529 A | * | 4/1992 | Konig | .................. | B60G 99/004 296/35.1 |
| 5,127,698 A | * | 7/1992 | Konig | ................... | F16F 1/3732 296/35.1 |
| 5,165,669 A | * | 11/1992 | Mayerbock | ............. | F16F 13/24 267/219 |
| 5,242,146 A | * | 9/1993 | Tecco | .................... | F16F 1/3935 267/141.1 |
| 5,295,671 A | * | 3/1994 | Nakagaki | ................ | F16F 1/387 267/140.13 |
| 5,297,769 A | * | 3/1994 | Le Fol | .................. | F16F 13/264 267/140.13 |

(Continued)

*Primary Examiner* — Robert A. Siconolfi
*Assistant Examiner* — James K Hsiao
(74) *Attorney, Agent, or Firm* — Quinn IP Law (57) ABSTRACT

A conical mount includes a housing defining an axis of rotation, a base member enclosed within the housing, a main rubber element coupled to the base member and enclosed within the housing, an upper metal portion positioned within the housing such that the main rubber element is positioned between the base member and upper metal portion, a radial snubber extending circumferentially around the upper metal portion, and a bearing assembly coupled with the radial snubber and positioned between the radial snubber and the upper metal portion. The bearing assembly enables the radial snubber to rotate freely about the axis of rotation to reduce a tangential load on the radial snubber.

20 Claims, 4 Drawing Sheets

(56) References Cited

U.S. PATENT DOCUMENTS

| | | | | |
|---|---|---|---|---|
| 6,321,890 B1* | 11/2001 | Suzuki | B60K 5/1208 188/380 |
| 6,386,529 B2* | 5/2002 | Bik | F16F 13/16 267/293 |
| 6,450,474 B1* | 9/2002 | Bucksbee | F16F 1/387 248/560 |
| 7,192,041 B2* | 3/2007 | Nicot | F16F 9/54 280/124.147 |
| 7,316,389 B2* | 1/2008 | Rawson | F16F 1/3732 267/141.5 |
| 7,552,916 B1* | 6/2009 | Williams | F16F 13/10 267/140.13 |
| 8,061,694 B2* | 11/2011 | Sugimoto | F16F 13/101 267/140.13 |
| 8,403,097 B2* | 3/2013 | Joly | F16F 1/373 267/140.13 |
| 8,439,336 B2* | 5/2013 | Moore | F16F 13/14 267/140.13 |
| 2006/0251353 A1* | 11/2006 | Schulz | H02K 5/1732 384/517 |
| 2009/0067767 A1* | 3/2009 | Faass | F16C 27/00 384/440 |
| 2013/0104852 A1* | 5/2013 | Kannan | F16F 1/41 123/456 |
| 2013/0170775 A1* | 7/2013 | Cymbal | F16C 19/527 384/456 |
| 2014/0140646 A1* | 5/2014 | Porter | F16C 23/045 384/202 |
| 2017/0166025 A1* | 6/2017 | Auten | B60G 11/12 |
| 2018/0058539 A1* | 3/2018 | Threadgold | F16F 1/3863 |
| 2018/0222305 A1* | 8/2018 | Kropp | F16F 7/09 |
| 2018/0281578 A1* | 10/2018 | Sykes | F16H 57/025 |
| 2019/0061512 A1* | 2/2019 | Noguez | F16F 15/08 |
| 2019/0085934 A1* | 3/2019 | Manzoor | F16F 15/126 |
| 2019/0293147 A1* | 9/2019 | Shinkawa | F16F 15/04 |
| 2020/0049225 A1* | 2/2020 | Robinson | F16F 13/14 |
| 2022/0194154 A1* | 6/2022 | Touzard | F16F 1/3732 |
| 2022/0213899 A1* | 7/2022 | Sato | F04D 29/053 |

* cited by examiner

CONICAL MOUNT WITH ROTATING RADIAL SNUBBER ASSEMBLY

INTRODUCTION

The present disclosure relates generally to an engine mount having a rotating snubber assembly.

A conventional engine mount includes a base, a main rubber element, and an upper metal portion including a snubber, all of which are contained within a housing. The snubber is radially fixed relative to the upper metal portion of the mount. A compression force on the snubber reacts against the engine torque. When coupled with a prop thrust force that exceeds a tangential friction force of the snubber, the snubber is forced across the housing, causing rubber wear.

SUMMARY

Embodiments according to the present disclosure provide a number of advantages. For example, embodiments according to the present disclosure reduce the tangential loads on a radial snubber by placing the radial snubber on a rotating bearing assembly that rotates freely about an upper metal component of the mount.

In one aspect of the present disclosure, a conical mount includes a housing defining an axis of rotation, a base member enclosed within the housing, a main rubber element coupled to the base member and enclosed within the housing, an upper metal portion positioned within the housing such that the main rubber element is positioned between the base member and upper metal portion, a radial snubber extending circumferentially around the upper metal portion, and a bearing assembly coupled with the radial snubber and positioned between the radial snubber and the upper metal portion. The bearing assembly enables the radial snubber to rotate freely about the axis of rotation to reduce a tangential load on the radial snubber.

In some aspects, the upper metal portion includes a machined groove extending circumferentially around the upper metal portion.

In some aspects, the bearing assembly is a bearing member including a low-friction ring and the bearing member is configured to fit within the machined groove.

In some aspects, the upper metal portion includes a machined groove having a first lip positioned at a first edge of the machined groove and a second lip positioned at a second edge of the machined groove such that the first and second lips define axially-spaced edges of a circumferential track defined by the machined groove.

In some aspects, the bearing assembly is a bearing member including a low-friction ring. The bearing member is configured to fit between the first and second lips and within the machined groove such that the first and second lips prevent axial translation of the radial snubber and the bearing member permits rotation of the radial snubber about the axis of rotation.

In some aspects, the upper metal portion includes a first upper metal portion and a second upper metal portion, and the radial snubber extends circumferentially around the first and second upper metal portions.

In some aspects, the first upper metal portion includes a first machined groove, and the second upper metal portion includes a second machined groove axially spaced from the first machined groove.

In some aspects, the bearing assembly includes a first surface and a second surface that together enclose a plurality of ball bearings and the first and second machined grooves are configured to receive the plurality of ball bearings.

In some aspects, the first upper metal portion includes an engagement surface and the second upper metal portion includes an interior surface configured to engage with the engagement surface such that the first and second upper metal portions are coupled with a press-fit engagement.

In some aspects, the first and second upper metal portions retain the plurality of ball bearings between the first and second upper metal portions and prevent axial translation of the radial snubber.

In another aspect of the present disclosure, a method for assembling a conical mount includes providing a base member, a main rubber element, an upper metal portion including a machined groove extending circumferentially around the upper metal portion, a bearing assembly, and a radial snubber coupled with the bearing assembly. The method includes pressing the radial snubber around the upper metal portion such that the bearing assembly fits within the machined groove to enable the radial snubber to rotate about an axis of rotation of the conical mount and enclosing the base member, the main rubber element, the upper metal portion, the bearing assembly, and the radial snubber within a housing.

In some aspects, the upper metal portion includes a first lip positioned at a first edge of the machined groove and a second lip positioned at a second edge of the machined groove such that the first and second lips define axially-spaced edges of a circumferential track defined by the machined groove and the bearing assembly fits within the circumferential track.

In some aspects, the bearing assembly is a bearing member including a low-friction ring.

In some aspects, the upper metal portion includes a first upper metal portion and a second upper metal portion. The machined groove includes a first machined groove formed in the first upper metal portion and a second machined groove formed in the second upper metal portion such that the second machined groove is axially spaced from the first machined groove. The bearing assembly includes a plurality of ball bearings and the first and second machined grooves are configured to receive the plurality of ball bearings.

In some aspects, the first upper metal portion includes an engagement surface and the second upper metal portion includes an interior surface configured to engage with the engagement surface such that the first and second upper metal portions are coupled with a press-fit engagement.

In another aspect of the present disclosure, a conical engine mount includes a housing defining an axis of rotation, a base member enclosed within the housing, a main rubber element coupled to the base member and enclosed within the housing, and an upper metal portion positioned within the housing such that the main rubber element is positioned between the base member and upper metal portion. The upper metal portion includes a machined groove extending circumferentially around an exterior surface of the upper metal portion. The machined groove is positioned between a first lip and a second lip such that the first lip and the second lip define axially-spaced edges of the machined groove. The conical engine mount also includes a radial snubber extending circumferentially around the upper metal portion and a bearing member coupled with the radial snubber and positioned between the radial snubber and the upper metal portion and within the machined groove such that the first and second lips prevent axial translation of the radial snubber and the bearing member permits rotation of the radial snubber about the axis of rotation.

In some aspects, the bearing member is a low-friction ring configured to fit between the first and second lips of the upper metal portion and within the machined groove.

In some aspects, the first upper metal portion includes a first machined groove, the second upper metal portion includes a second machined groove axially spaced from the first machined groove, the first upper metal portion includes an engagement surface, and the second upper metal portion includes an interior surface configured to engage with the engagement surface such that the first and second upper metal portions are coupled with a press-fit engagement.

In some aspects, the bearing member includes a first surface and a second surface that together enclose a plurality of ball bearings and the first and second machined grooves are configured to receive the plurality of ball bearings.

In some aspects, the first and second upper metal portions retain the plurality of ball bearings between the first and second upper metal portions and prevent axial translation of the radial snubber.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The embodiments of a conical mount, such as a conical engine mount, place the radial snubber of the conical mount on a rotating bearing assembly that is attached to the mount upper metal portion. The rotating bearing assembly is able to rotate freely about the axial direction of the mount such that a tangential load on the snubber is minimized. The coefficient of friction between the bearing assembly and the upper metal portion is optimized, in some embodiments, through the use of plastic and other low friction materials or through the use of ball bearings. In various embodiments, the snubber has a uniform thickness, and a mount deflection is determined by the shape of the mount can housing. In various embodiments, the mount housing shape is oblong to provide a different fore/aft and lateral metal to metal and free travel deflection in response to the forces applied to the conical mount.

One embodiment of a conical mount 100, such as a conical engine mount, is shown in FIGS. 1, 2, and 3A-B. The conical mount 100 includes a housing 102. The housing 102 encloses the other components of the conical mount 100, including a base member 104, a main rubber element 106 coupled to the base member 104, an upper metal portion 108, and a radial snubber 112 extending circumferentially around the upper metal portion 108. In various embodiments, the housing 102 is metal, such as steel, the base member 104 is made from one of multiple material options, the main rubber element 106 is a natural or synthetic rubber, and the upper metal portion 108 is a metal, such as aluminum. The conical mount 100 defines an axis A around which the radial snubber 112 rotates, as described below.

The upper metal portion 108 includes a machined groove 110 extending circumferentially around the upper metal portion 108. The radial snubber 112 is coupled with a bearing assembly such as the bearing member 114. In various embodiments, the radial snubber 112 is molded to the bearing member 114. In the illustrated embodiment, the bearing member 114 is a low friction bearing ring such as a plastic ring. The low friction surface of the bearing member 114 allows the radial snubber 112 to rotate about the axis A of the conical mount 100.

Figure 1:
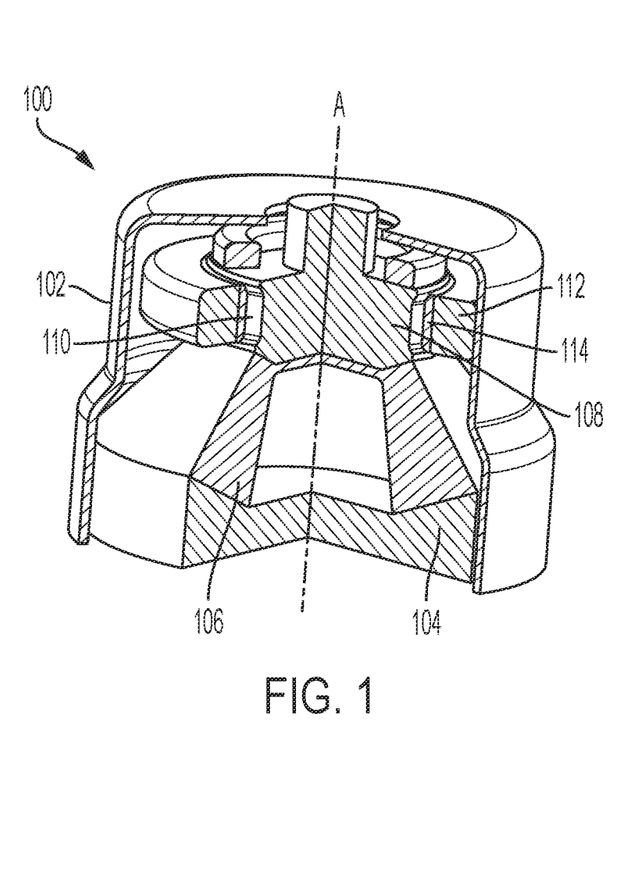
FIG. 1 is a schematic perspective cutaway view of a conical mount including a rotatable radial snubber, according to an embodiment.
Figure 2:
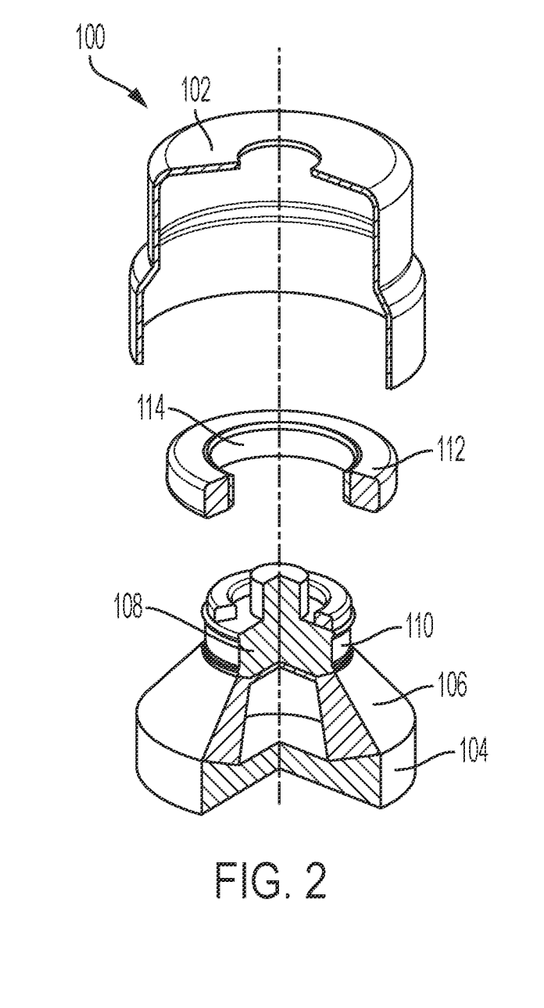
FIG. 2 is a schematic exploded and cutaway view of the conical mount of FIG. 1.
Figure 3A:
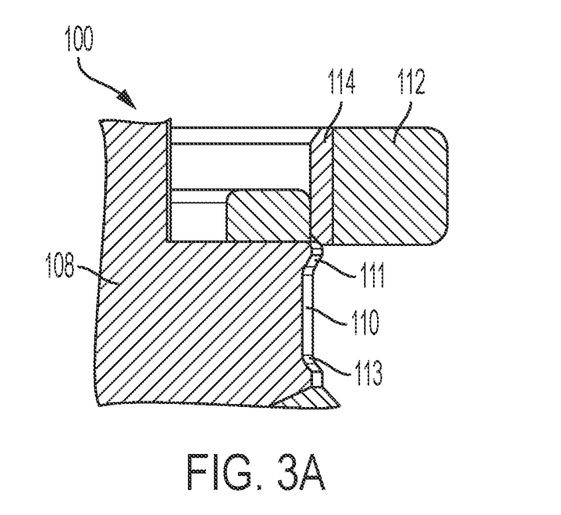
FIG. 3A is a schematic partial cross-sectional view of the conical mount of FIG. 1 with the rotatable radial snubber in a first or uninstalled position.
Figure 3B:
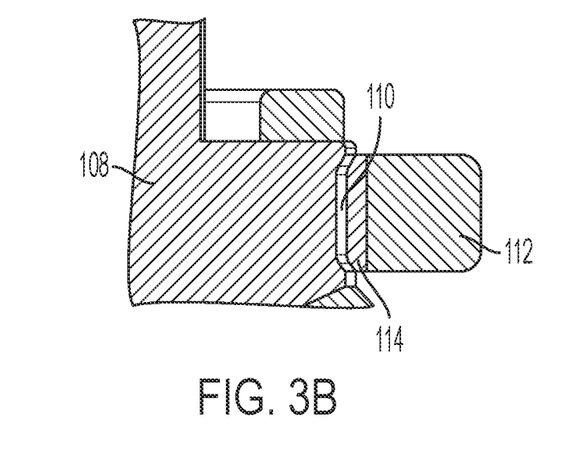
FIG. 3B is a schematic partial cross-sectional view of the conical mount of FIG. 1 with the rotatable radial snubber in a second or installed position.

The bearing member 114 is configured to fit within the machined groove 110. The machined groove 110 acts as a track to allow axial rotation of the radial snubber 112 while preventing axial translation of the radial snubber 112. With reference to FIGS. 3A and 3B, the machined groove 110 includes a first lip 111 positioned at a first edge of the machined groove 110 and a second lip 113 positioned at a second edge of the machined groove 110. The first and second lips 111, 113 define axially-spaced edges of the circumferential track defined by the machined groove 110. The bearing member 114 is configured to fit between the first and second lips 111, 113 such that the first and second lips 111, 113 prevent axial translation of the radial snubber 112.

The bearing member 114 is pressed into the machined groove 110 from the first, or uninstalled, position shown in FIG. 3A, to the second, or installed, position shown in FIG. 3B. Once in the second position, the radial snubber 112 is able to rotate about the axis A relative to the upper metal portion 108 to minimize the tangential load on the radial snubber 112.

Another embodiment of a conical engine mount 200 is shown in FIGS. 4, 5, and 6A-C. Similar to the embodiment shown in FIGS. 1, 2, and 3A-B, the engine mount 200 includes a housing 202. The housing 202 encloses the other components of the conical mount 200, including a base member 204, a main rubber element 206, a first upper metal portion 208, a second upper metal portion 209, and a radial snubber 212. In various embodiments, the housing 202 is metal, such as steel, the base member 204 is made from one of multiple material options, the main rubber element 206 is a natural or synthetic rubber, and the first and second upper metal portions 208, 209 are a metal, such as aluminum. The conical mount 200 defines an axis A around which the radial snubber 212 rotates, as described below.

Figure 4:
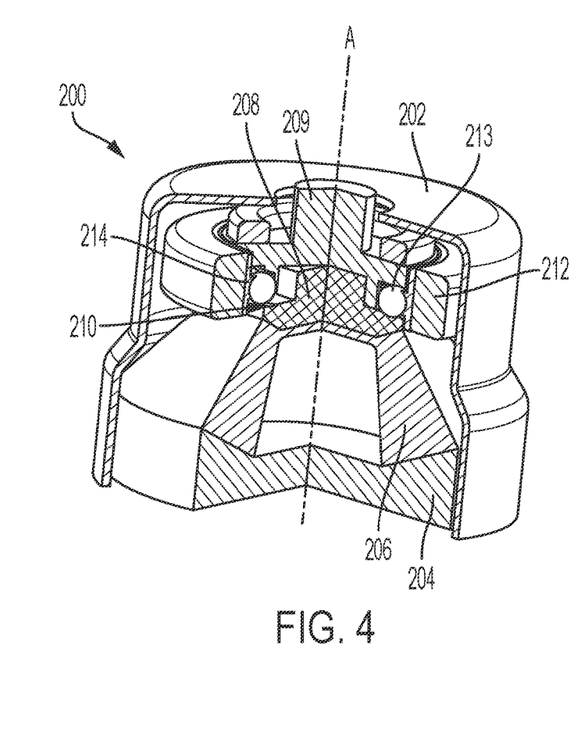
FIG. 4 is a schematic perspective cutaway view of a conical mount including a rotatable radial snubber, according to another embodiment.
Figure 5:
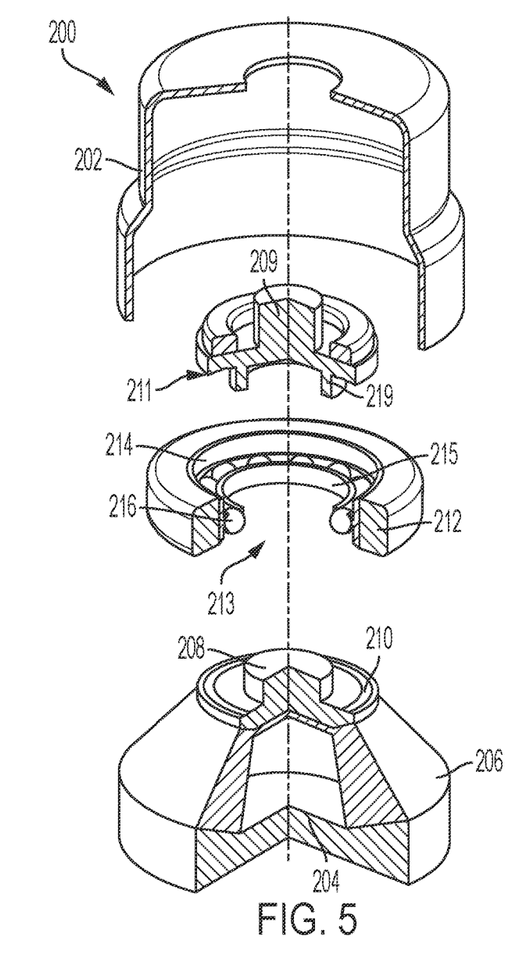
FIG. 5 is a schematic exploded and cutaway view of the conical mount of FIG. 4.

The radial snubber 212 is coupled with a bearing assembly 213. The bearing assembly 213 is coupled to an interior surface of the radial snubber 212 and includes a first surface 214 and a second surface 215 that enclose a plurality of ball bearings 216.

Figure 6A:
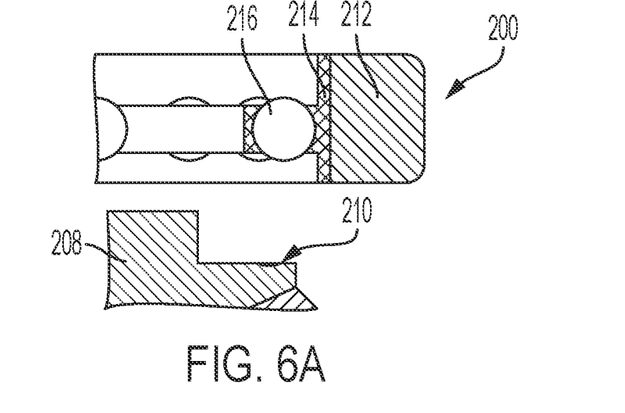
FIG. 6A is a schematic partial cross-sectional view of the conical mount of FIG. 4 with the rotatable radial snubber in a first or uninstalled position.
Figure 6B:
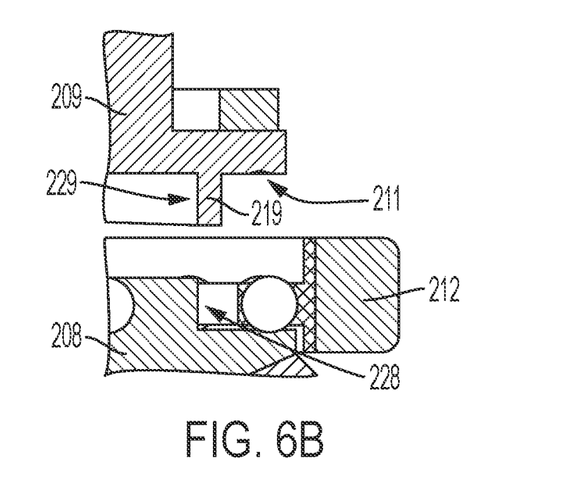
FIG. 6B is a schematic partial cross-sectional view of the conical mount of FIG. 4 with the rotatable radial snubber in a second or installed position.
Figure 6C:
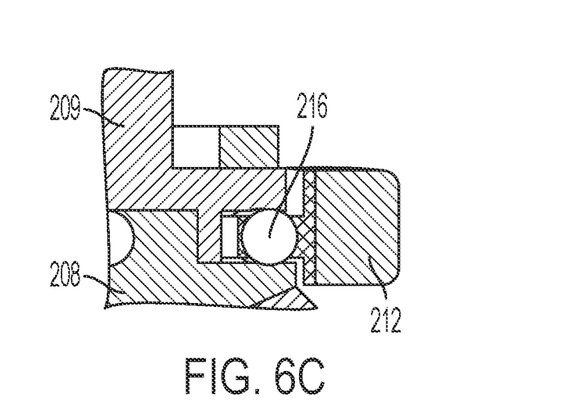
FIG. 6C is a schematic partial cross-sectional view of the conical mount of FIG. 4 with the conical mount in a fully installed condition.

With reference to FIGS. 6A-C, assembly details of the conical mount 200 are illustrated. The first upper metal portion 208 includes a first machined groove 210. The second upper metal portion 209 includes a second machined groove 211 axially-spaced from the first machined groove 210. The first machined groove 210 extends radially near an outer edge of the first upper metal portion 208 and the second machined groove 211 extends radially near an outer edge of the second upper metal portion 209 such that the first and second machined grooves 210, 211 form an axially-separated track. The separated track formed by the first and second machined grooves 210, 211 is configured to receive the plurality of ball bearings 216.

The first upper metal portion 208 includes an engagement surface 228 that is configured to engage with an interior surface 229 of the radial extension 219 of the second upper metal portion 209 when the first and second upper metal portions 208, 209 are press fit to an installed position, as shown in FIG. 6C. In the installed position shown in FIG. 6C, the first and second upper metal portions 208, 209 retain the ball bearings 216 between them, locking the ball bearings 216 in place, and prevent axial translation of the radial snubber 212. The radial snubber 212 is able to rotate about the axis A relative to the first and second upper metal portions 208, 209 to minimize the tangential load on the radial snubber 212.

In various embodiments, the radial snubbers 112, 212 have a uniform thickness and the geometry of the housings 102, 202 determines the radial metal to metal travel. When radial loads are applied in series to the conical mount 100, 200, the bearing member 114 or bearing assembly 213 enables rotation of the radial snubber 112, 212 about the axis A. The rotation of the radial snubber 112, 212 about the axis A of the conical mount 100, 200 allows the radial snubber 112, 212 to remain in compressive strain rather than shear strain.

When in use as an engine mount, the compression force on the radial snubber 112, 212 of the conical mount 100, 200 reacts against the engine torque. The maximum tangential friction force on the radial snubber 112, 212 is the compression force multiplied by the coefficient of friction of the bearing member 114 or bearing assembly 213. When compression force due to engine torque is coupled with a prop thrust force, the bearing member 114 and the bearing assembly 213 permit rotation prior to exceeding the tangential friction force of the radial snubber 112, 212, thus reducing rubber wear of the radial snubber 112, 212.

Assembly of the conical mount 100 includes the following steps. First, the base member 104, the main rubber element 106, the upper metal portion 108, the bearing assembly including the bearing member 114, and the radial snubber 112 are provided. The radial snubber 112 is coupled with the bearing member 114 and the main rubber element 106 is coupled with the base member 104. The radial snubber 112 is pressed around the upper metal portion 108 such that the bearing member 114 fits within the machined groove 110 that extends circumferentially around the upper metal portion 108. The press-fit assembly of the radial snubber 112 with the upper metal portion 108 allows the radial snubber 112 to rotate about the axis of rotation A of the conical mount 100 while preventing axial translation of the radial snubber 112. The base member 104, the main rubber element 106, the upper metal portion 108, the bearing assembly including the bearing member 114, and the radial snubber 112 are then enclosed within the housing 102. A similar press-fit engagement assembly operation is used to assemble the conical mount 200.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A conical mount, comprising:
    a housing defining an axis of rotation;
    a base member enclosed within the housing;
    a main rubber element coupled to the base member and enclosed within the housing;
    an upper metal portion positioned within the housing such that the main rubber element is positioned between the base member and upper metal portion;
    a radial snubber extending circumferentially around the upper metal portion; and
    a bearing assembly coupled with the radial snubber and positioned between the radial snubber and the upper metal portion;
    wherein the bearing assembly enables the radial snubber to rotate freely about the axis of rotation to reduce a tangential load on the radial snubber.

2. The conical mount of claim 1, wherein the upper metal portion includes a machined groove extending circumferentially around the upper metal portion.

3. The conical mount of claim 2, wherein the bearing assembly is a bearing member comprising a low-friction ring and the bearing member is configured to fit within the machined groove.

4. The conical mount of claim 1, wherein the upper metal portion includes a machined groove having a first lip positioned at a first edge of the machined groove and a second lip positioned at a second edge of the machined groove such that the first and second lips define axially-spaced edges of a circumferential track defined by the machined groove.

5. The conical mount of claim 4, wherein the bearing assembly is a bearing member comprising a low-friction ring and the bearing member is configured to fit between the first and second lips and within the machined groove such that the first and second lips prevent axial translation of the radial snubber and the bearing member permits rotation of the radial snubber about the axis of rotation.

6. The conical mount of claim 1, wherein the upper metal portion includes a first upper metal portion and a second upper metal portion, and the radial snubber extends circumferentially around the first and second upper metal portions.

7. The conical mount of claim 6, wherein the first upper metal portion includes a first machined groove, and the second upper metal portion includes a second machined groove axially spaced from the first machined groove.

8. The conical mount of claim 7, wherein the bearing assembly includes a first surface and a second surface that together enclose a plurality of ball bearings and the first and second machined grooves are configured to receive the plurality of ball bearings.

9. The conical mount of claim 8, wherein the first upper metal portion includes an engagement surface, and the second upper metal portion includes an interior surface configured to engage with the engagement surface such that the first and second upper metal portions are coupled with a press-fit engagement.

10. The conical mount of claim 9, wherein the first and second upper metal portions retain the plurality of ball bearings between the first and second upper metal portions and prevent axial translation of the radial snubber.

11. A method for assembling a conical mount, comprising:
    providing a base member, a main rubber element, an upper metal portion including a machined groove extending circumferentially around the upper metal portion, a bearing assembly, and a radial snubber coupled with the bearing assembly;
    pressing the radial snubber around the upper metal portion such that the bearing assembly fits within the machined groove to enable the radial snubber to rotate about an axis of rotation of the conical mount; and enclosing the base member, the main rubber element, the upper metal portion, the bearing assembly, and the radial snubber within a housing.

12. The method of claim 11, wherein the upper metal portion includes a first lip positioned at a first edge of the machined groove and a second lip positioned at a second edge of the machined groove such that the first and second lips define axially-spaced edges of a circumferential track defined by the machined groove and the bearing assembly fits within the circumferential track.

13. The method of claim 12, wherein the bearing assembly is a bearing member comprising a low-friction ring.

14. The method of claim 11, wherein the upper metal portion includes a first upper metal portion and a second upper metal portion, the machined groove includes a first machined groove formed in the first upper metal portion and a second machined groove formed in the second upper metal portion such that the second machined groove is axially spaced from the first machined groove, the bearing assembly includes a plurality of ball bearings, and the first and second machined grooves are configured to receive the plurality of ball bearings.

15. The method of claim 14, wherein the first upper metal portion includes an engagement surface, and the second upper metal portion includes an interior surface configured to engage with the engagement surface such that the first and second upper metal portions are coupled with a press-fit engagement.

16. A conical engine mount, comprising:
a housing defining an axis of rotation;
a base member enclosed within the housing;
a main rubber element coupled to the base member and enclosed within the housing;
an upper metal portion positioned within the housing such that the main rubber element is positioned between the base member and upper metal portion, the upper metal portion including a machined groove extending circumferentially around an exterior surface of the upper metal portion, the machined groove positioned between a first lip and a second lip such that the first lip and the second lip define axially-spaced edges of the machined groove;
a radial snubber extending circumferentially around the upper metal portion; and
a bearing member coupled with the radial snubber and positioned between the radial snubber and the upper metal portion and within the machined groove such that the first and second lips prevent axial translation of the radial snubber and the bearing member permits rotation of the radial snubber about the axis of rotation.

17. The conical engine mount of claim 16, wherein the bearing member is a low-friction ring configured to fit between the first and second lips of the upper metal portion and within the machined groove.

18. The conical engine mount of claim 16, wherein the upper metal portion includes a first upper metal portion and a second upper metal portion, the first upper metal portion includes a first machined groove, the second upper metal portion includes a second machined groove axially spaced from the first machined groove, the first upper metal portion includes an engagement surface, and the second upper metal portion includes an interior surface configured to engage with the engagement surface such that the first and second upper metal portions are coupled with a press-fit engagement.

19. The conical engine mount of claim 18, wherein the bearing member includes a first surface and a second surface that together enclose a plurality of ball bearings and the first and second machined grooves are configured to receive the plurality of ball bearings.

20. The conical engine mount of claim 19, wherein the first and second upper metal portions retain the plurality of ball bearings between the first and second upper metal portions and prevent axial translation of the radial snubber.

* * * * *